(12) United States Patent
Nagayasu

(10) Patent No.: US 6,801,988 B2
(45) Date of Patent: Oct. 5, 2004

(54) DATA BUFFER FOR BLOCK UNIT DATA TRANSFER TO SDRAM

(75) Inventor: Masaru Nagayasu, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 286 days.

(21) Appl. No.: 10/193,277

(22) Filed: Jul. 12, 2002

(65) Prior Publication Data

US 2003/0014601 A1 Jan. 16, 2003

(30) Foreign Application Priority Data

Jul. 12, 2001 (JP) .......................................... 2001-211710

(51) Int. Cl.[7] .............................................. G06F 12/00
(52) U.S. Cl. ...................... 711/154; 711/171; 710/34; 710/52; 710/56; 345/543; 345/547; 345/565; 345/567
(58) Field of Search ................................ 711/154, 170, 711/171; 710/33, 34, 52, 56, 60; 345/543, 544, 545, 547, 565, 567

(56) References Cited

U.S. PATENT DOCUMENTS

5,928,339 A    7/1999  Nishikawa ................... 710/26
6,111,592 A    8/2000  Yagi ............................ 345/537

*Primary Examiner*—Kevin Verbrugge
*Assistant Examiner*—Jasmine Song
(74) *Attorney, Agent, or Firm*—McDermott Will & Emery LLP (57) ABSTRACT

An initial address register holds a transfer destination address as an initial address. Data is written into an input data register to which a unique address is allocated. The written data is put together into a data block having a predetermined transfer destination data size. This enhances the efficiency of data transfer from a software program for processing data in several byte units to a memory and a coprocessor optimized for data transfer in block units of several tens of bytes, and thus improves system performance.

7 Claims, 6 Drawing Sheets

DATA BUFFER FOR BLOCK UNIT DATA TRANSFER TO SDRAM

BACKGROUND OF THE INVENTION

The present invention relates to a data buffer providing a means for enhancing the efficiency of data transfer to a memory and a coprocessor optimized for block-unit data transfer.

With recent enhancement in performance of microprocessors and the like, it has become necessary to provide a memory interface with high data transfer capability. There are two ways for improving the data transfer capability of a memory; increasing the bit width for data transfer and increasing the data transfer rate.

With size scale-down in semiconductor fabrication process, the memory capacity has increased. To improve the data transfer capability without increasing the holding memory amount, it is necessary to shorten the transfer cycle time while rather decreasing, not increasing, the bit width for the data transfer.

Under the circumstances described above, there have been developed memories such as SDRAMs and RDRAMs having a high-speed synchronous transfer capability exceeding 100 MHz and memory interfaces corresponding to such memories. These memories realize high-speed data transfer by accessing data with a large bit width inside the device, buffering data in data block units, and outputting data at continuous several to several tens of clocks. These memories therefore have a feature of being high in data transfer capability (throughput) but large in the time required from address input until access of first data of relevant block data (latency). This indicates that if such a memory intended for high-speed synchronous transfer frequently performs access of data having a size smaller than the block handled by the memory, the memory transfer capability decreases, and this will rather degrade the system performance.

To solve the above problem, the following measure is taken. Interfaces for SDRAMs and RDRAMs have a buffer memory appropriate to the block size of the corresponding memory. Using the buffer memory, continuous data accesses are put together into one when the addresses for the current data access and the next data access are continuous, to enhance the data transfer capability. However, this measure is effective only when the accesses accompanied by prefetch of instructions and data and the read/write operations by a DMA controller and the like are respectively continuous temporally. In general systems, instruction fetch, data access and DMA access compete with one another. Therefore, the above measure fails to provide an effect commensurate with the large-scale and complicate interface.

In view of the above, the problem to be solved by the present invention is to enhance the efficiency of data transfer in the case, for example, of transferring results of processing of media data and results of calculation of coordinates of image data to a coprocessor for graphics in digital TV sets and portable equipment.

The processing described above requires a large amount of data and a large scale of computation. Therefore, although the data transfer is directed to consecutive addresses when considered in a long time unit, it lacks in continuity when considered in a short time unit. Therefore, such data transfer fails to benefit from the effect of the memory interface described above having the measure of putting together a plurality of data accesses into one. Moreover, since write of the processing results largely delays, read of memory data required for new processing must wait. This further degrades the system performance.

SUMMARY OF THE INVENTION

An object of the present invention is providing a data buffer capable of enhancing the efficiency of data transfer from an operator such as a CPU to a memory and a coprocessor optimized for block-unit data transfer and thereby enhancing system performance.

To solve the problem described above, the present invention utilizes the points that the data in question will not be referred to by the same program after being written, and that the data is written to consecutive addresses but the write of the data is not continuous temporally. In other words, according to the present invention, there is provided a means for writing data into an input data register to which a unique address is allocated and putting together the written data into a data block of a predetermined transfer destination data size (N bytes; N=16, for example).

To state specifically, the first feature of the invention is to provide a data buffer including: an initial address register for holding a transfer destination address input via a data bus as an initial address; an input data register for holding maximum k pieces (k is an integer equal to or more than 2) of M-byte data (M is an integer equal to or more than 1) input via the data bus; an address decoder for decoding an address on an address bus so that the transfer destination address on the data bus is written into the initial address register if the address on the address bus is an address designating the initial address register and that the M-byte data on the data bus is written into the input data register if the address on the address bus is an address designating the input data register when a data buffer write signal is provided; an accumulated data size register for holding an accumulated data size representing the size of a data block of maximum N bytes (N=kM) accumulated in the input data register; an output data register for holding a data block to be transferred; a block address register for holding a head address of the data block to be transferred; a block size register for holding the block size representing the size of the data block to be transferred; a block address counter for setting the initial address transferred from the initial address register as an initial value and holding a block address updated according to the block size; and a sequence controller for updating the accumulated data size by M byte(s) every time the M-byte data on the data bus is written into the input data register, setting the block size in the block size register at N bytes if the initial address is an N-byte boundary address (an address divisible by N), waiting until the accumulated data size reaches N bytes, transferring the data block of N bytes accumulated in the input data register to the output data register, transferring the block address held by the block address counter to the block address register, asserting a block data write request signal so that the data block of N bytes held by the output data register is transferred, resetting the accumulated data size at 0, and updating the block address held by the block address counter by N bytes.

The second feature of the data buffer of the invention is that data transfer of a new block to a destination continuous from the previous destination is possible by writing data into the input data register without setting a new transfer destination address in the initial address register. This eliminates the necessity of designating the transfer destination is address every write of data into the data buffer, and thus enhances the data transfer efficiency.

The third feature of the data buffer of the invention is that the data buffer may be provided with a means for forcefully transferring data to a memory in the following manner. That is, when data of a size less than the block data size exists in the input data register at the time of setting of a transfer destination address in the initial address register, the entire existing data is swept out of the input data register as block data by assertion of the block data write request signal. With provision of this means, data can be forcefully transferred under software instruction in the case of transfer of data of which size is not a value obtained by multiplying the block size by an integer, for example.

The fourth feature of the invention is as follows. When a transfer destination address that is not at an N-byte boundary is designated, the block data write request signal may be asserted every write into the input data register until a byte boundary corresponding to the block size is reached. With this configuration, the data buffer can support a memory controller allowing only data transfer in 4-byte units in addition to the data transfer in 16-byte units and having no block transfer means in 8-byte units or 12-byte units in the case of N=16, for example.

The fifth feature of the data buffer of the invention is that when a transfer destination address other than an N-byte boundary address is designated, data up to a byte boundary corresponding to the block size may be put together as block data and the block data write request signal may be asserted. With this configuration, the data buffer can support a memory controller having a block transfer means allowing data transfers in 4-byte units, 8-byte units and 12-byte units in addition to the data transfer in 16-byte units in the case of N=16, for example, unlike the fourth feature described above, and thus optimum memory access is provided.

The sixth feature of the data buffer of the invention is that the data buffer can hold two or more blocks of block data, to provide buffering between the rate of write from the CPU and the block data transfer rate.

The seventh feature of the data buffer of the invention is that a signal for disabling write into the input data register may be generated if transfer to the memory controller and the like fails to catch up with the write into the data buffer. This prevents written data from being lost.

DESCRIPTION OF THE PREFERRED EMBODIMENTS

Figure 1:
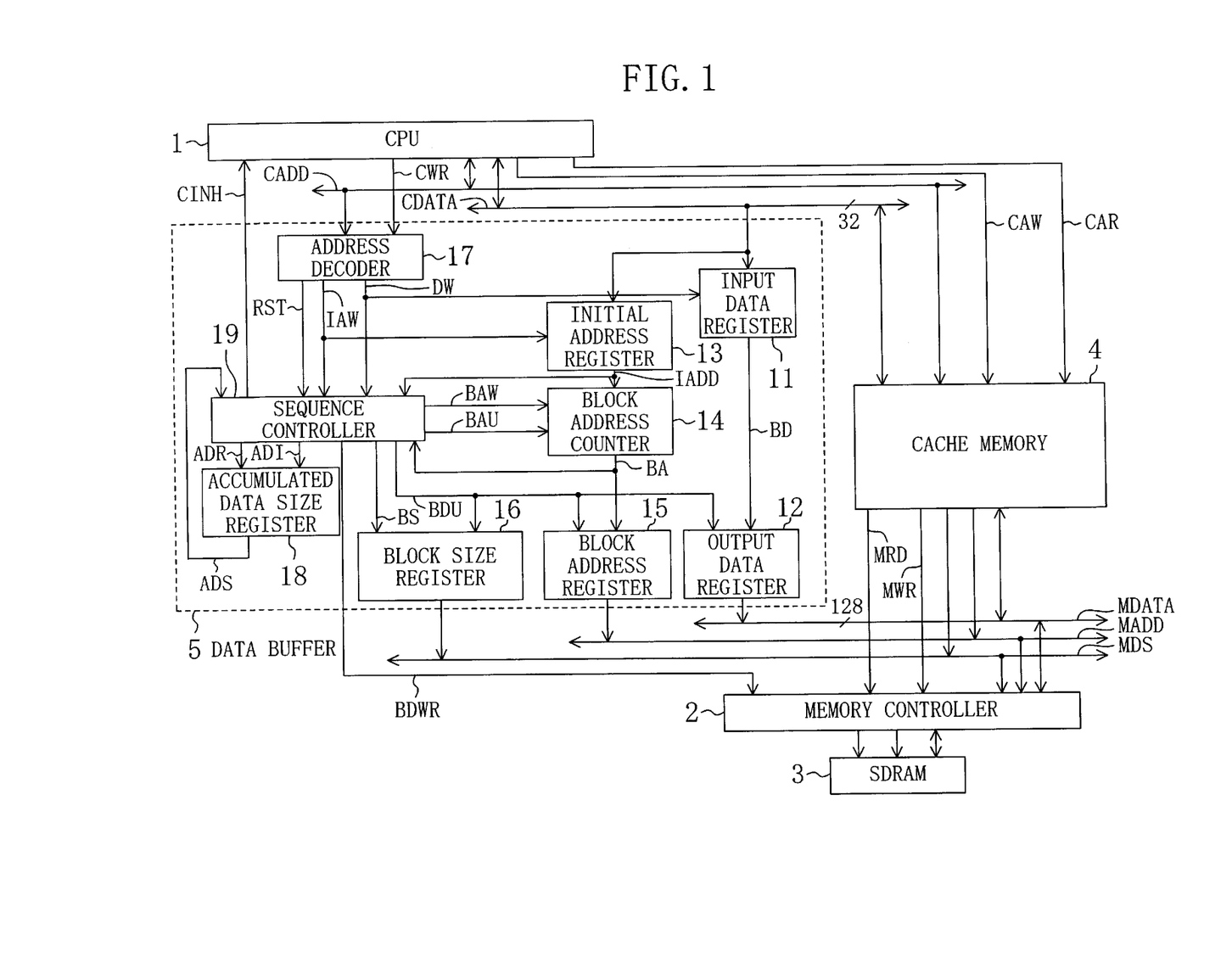
FIG. 1 is a block diagram of a computer system incorporating a data buffer of an embodiment of the present invention.

FIG. 1 illustrates an exemplified configuration of a computer system incorporating a data buffer of an embodiment of the present invention. The illustrated computer system includes a CPU 1, a memory controller 2 and a SDRAM 3. The computer system further includes, between the CPU 1 and the memory controller 2, a cache memory 4 and a data buffer 5 of the embodiment of the invention. The data buffer 5 includes an input data register 11, an output data register 12, an initial address register 13, a block address counter 14, a block address register 15, a block size register 16, an address decoder 17, an accumulated data size register 18 and a sequence controller 19.

The data buffer 5 shown in FIG. 1 is connected to the CPU 1 via a CPU address bus (CADD), a CPU data bus (CDATA) and a data buffer write signal (CWR). When the CPU 1 asserts CWR, the address decoder 17 decodes an accessed address, and enables write of an address into the initial address register 13 or write of data into the input data register 11. To state more specifically, when the value of CADD designates the initial address register 13 at the time of assertion of CWR, the address decoder 17 asserts an initial address write signal (IAW). By this assertion, address data on CDATA is transferred to the initial address register 13. When the value of CADD designates the input data register 11 at the time of assertion of CWR, the address decoder 17 asserts a data write signal (DW). By this assertion, data on CDATA is transferred to the input data register 11. The address decoder 17 also has a function of asserting a reset signal (RST) to the sequence controller 19 when the address decoder 17 detects an access for initialization of the data buffer 5 from the CPU 1.

The data buffer 5 is connected to the memory controller 2 via a memory address bus (MADD), a memory data bus (MDATA), a memory access data size bus (MDS) and a block data write request signal (BDWR). The cache memory 4 is also connected to the memory controller 2 via MADD, MDATA and MDS. The memory controller 2 arbitrates between an access request from the cache memory 4 by a memory read signal (MRD) and a memory write signal (MWR) and an access request from the data buffer 5 by BDWR, to perform data write into and data read from the SDRAM 3.

The CPU 1 can read data from the cache memory 4 via CDATA by asserting a cache read signal (CAR) for an address designated by CADD. Also, the CPU 1 can execute operation using the data read from the cache memory 4 and write the operation results into the data buffer 5. Moreover, the CPU 1 can write data into the cache memory 4 via CDATA by asserting a cache write signal (CAW) for an address designated by CADD.

Hereinafter, the operation of the data buffer 5 of the present invention will be described with reference to FIGS. 2 to 5. For convenience of description, assume that the unit of write by the CPU 1 is 4 bytes and the block data size is 16 bytes. That is, CDATA is composed of 4 bytes (32 bits), and both block data (BD) as the output of the input data register 11 and MDATA as the output of the output data register 12 are composed of 16 bytes (128 bits). Assume also that access is made to address A0 for reset of the data buffer 5, to address A1 for write into the initial address register 13, and to address A2 for write into the input data register 11.

Figure 2:
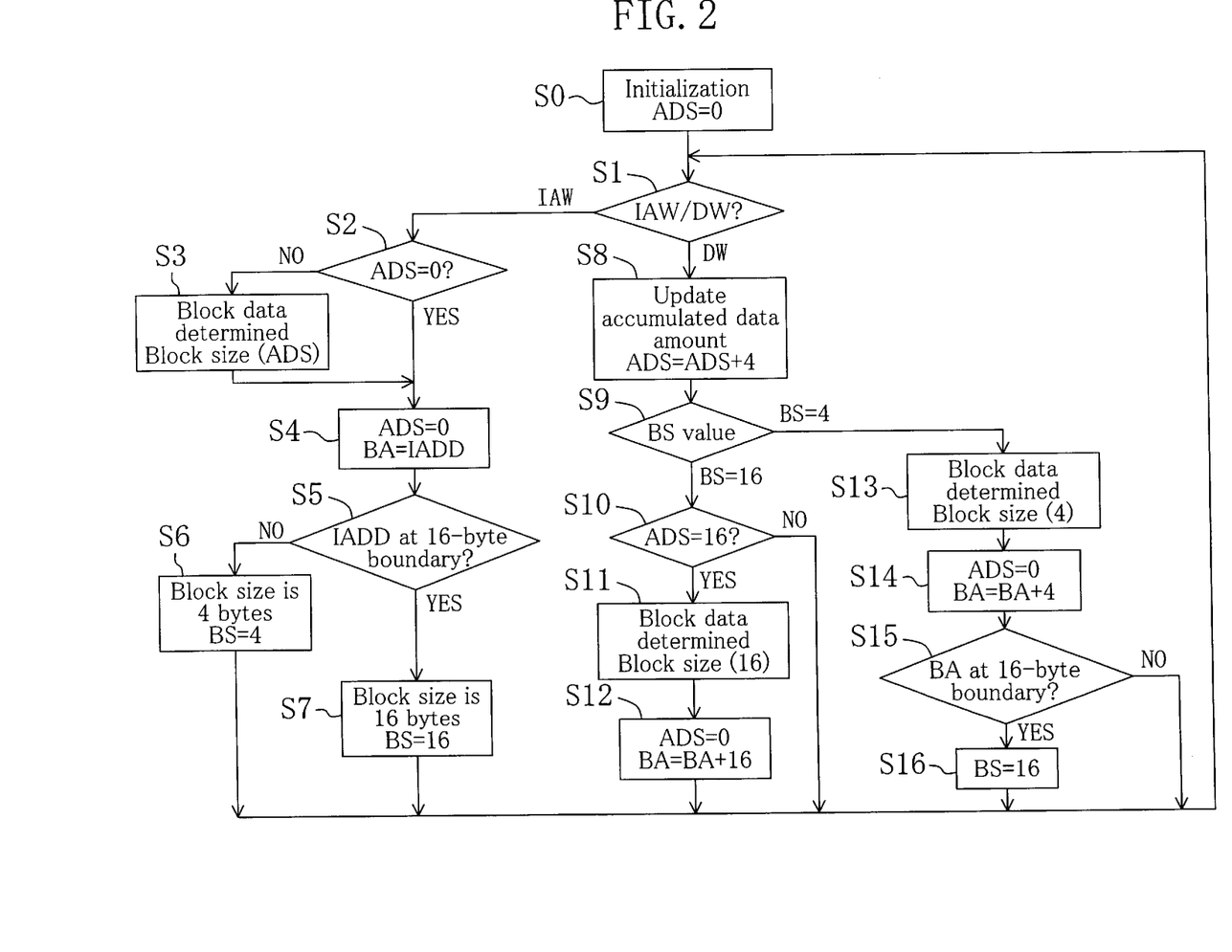
FIG. 2 is a flowchart of an address generation algorithm used by the data buffer in FIG. 1.

FIG. 2 illustrates an address generation algorithm used by the data buffer 5. In step S0, the address decoder 17 decodes address A0 for initialization of the data buffer 5 and asserts RST. In response to this, the sequence controller 19 asserts an accumulated data size reset signal (ADR), which is directed to the accumulated data size register 18, to initialize the accumulated data size (ADS) representing the size of the data block accumulated in the input data register 11 to zero. In step S1, whether the current write into the data buffer 5 is write of the initial address (IADD) into the initial address register 13 or write of data into the input data register 11 is determined. If it is write into the initial address register 13, whether or not the value of ADS is 0 is determined in step S2. If the value of ADS is other than 0, indicating that there exists data accumulated, the block size (BS) is updated to the value of ADS, a block data update signal (BDU) is asserted, and BDWR is asserted to allow the accumulated data to be transferred to the memory controller 2 (step S3). If the value of ADS is 0, indicating that there exists no data accumulated, the process proceeds to step S4. In step S4, the value of ADS is set at 0 again, and a block address write signal (BAW) is asserted to allow a block address (BA) in the block address counter 14 to be set at IADD. In step S5, whether or not IADD is an address at a 16-byte boundary is determined. If IADD is not a 16-byte boundary value, BS is set at 4 bytes as the size of data write into the data buffer 5 (fixed size determined during design) in step S6. If IADD is a 16-byte boundary value, BS is set at 16 bytes in step S7. From steps S6 and S7, the process returns to step S1.

If the write into the data buffer 5 is write into the input data register 11 in step S1, an accumulated data size increment signal (ADI) is asserted to update ADS by 4 bytes in step S8. In step S9, one of two controls as follows is selected according to the value of BS.

If the value of BS indicates 16 bytes, whether or not 16-byte data has been accumulated is determined from the value of ADS in step S10. If the value of ADS indicates 16 bytes, BDWR is asserted and MDS is set to be a signal indicating a 16-byte value, to allow the accumulated data to be transferred to the memory controller 2 in step S11. In step S12, ADR is asserted to reset the value of ADS at 0, and the value of BA is incremented by 16 corresponding to the number of bytes transferred upon assertion of a block address update signal (BAU). If the value of ADS does not indicate 16 bytes in step S10, the process returns to step S1.

If the value of BS indicates 4 bytes in step S9, BDWR is asserted and MDS is set to be a signal indicating a 4-byte value, to allow the accumulated data to be transferred to the memory controller 2 in step S13. The process then proceeds to step S14, where ADR is asserted to reset the value of ADS at 0, and the value of BA is incremented by 4 corresponding to the number of bytes transferred upon assertion of BAU. In step S15, whether or not the value of BA now indicates an address at a 16-byte boundary due to the increment is determined. If yes, the value of BS is set at 16 bytes in step S16 to enable subsequent data transfer in 16-byte units. Otherwise, the value of BS is not changed, and the process returns to step S1.

Figure 3:
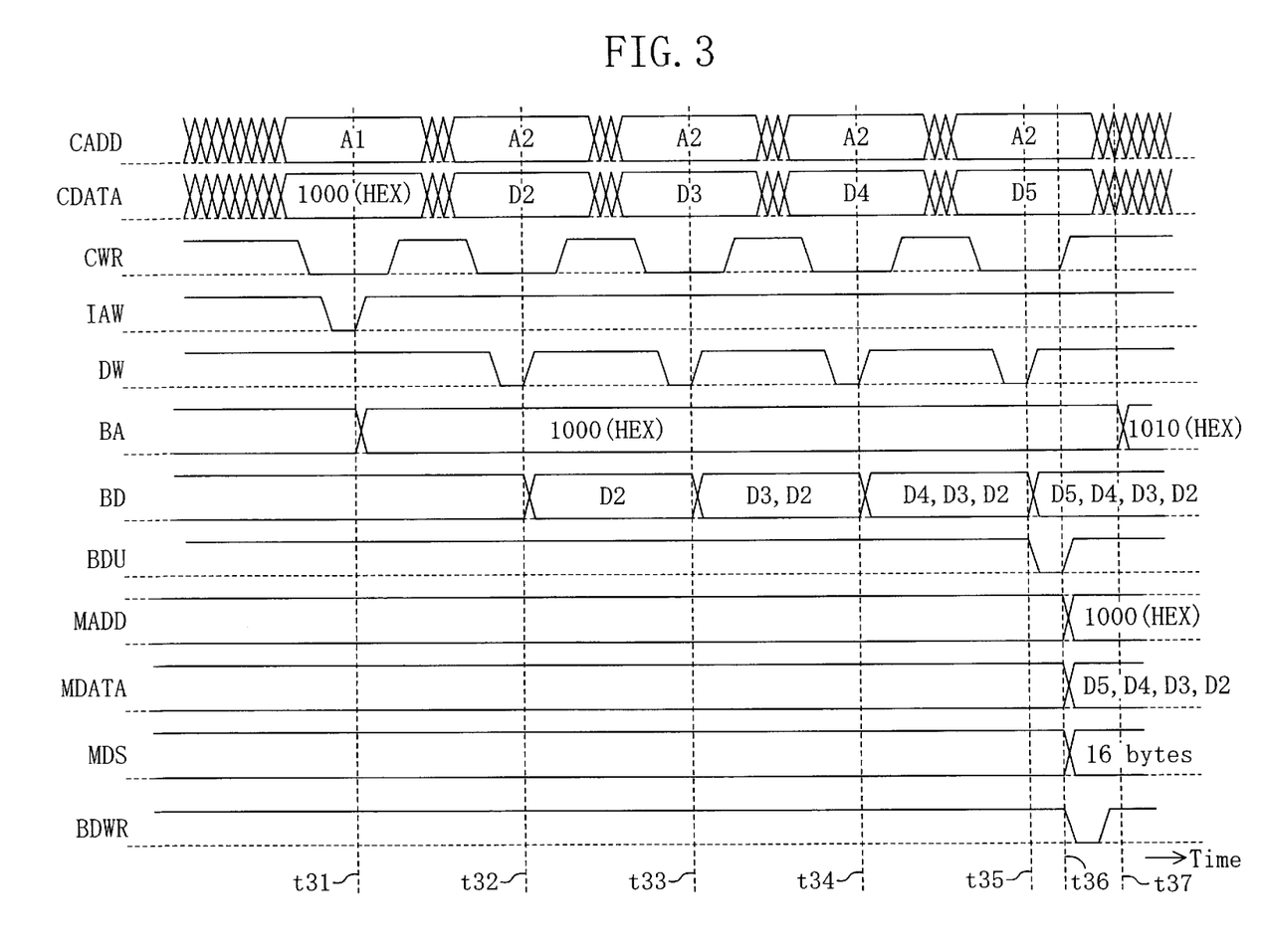
FIG. 3 is a timing chart showing an example of the operation of the data buffer in FIG. 1.

Next, an example of the operation of the data buffer 5 will be described with reference to a timing chart of FIG. 3. The address decoder 17 knows from the value of CADD that the destination of the access by the CPU 1 is the initial address register 13 and asserts IAW to allow value 1000 (hexadecimal notation (HEX)) to be written into the initial address register 13 at time t31, setting IADD at 1000 (HEX). In response to the assertion of IAW, the sequence controller 19 asserts BAW to allow 1000 (HEX) to be set in the block address counter 14. Thereafter, the CPU 1 outputs value A2 to CADD and value D2 to CDATA, and asserts CWR. The address decoder 17 knows from the value of CADD that the destination of this access by the CPU 1 is the input data register 11, and asserts DW to allow the value D2 to be written into the input data register 11 at time t32, setting BD at D2. Subsequently, value D3 is written at time t33, value D4 is written at time t34, and value D5 is written at time t35. In this way, 16-byte data is held in the input data register 11. The sequence controller 19 asserts ADI every time data is written into the input data register 11, updating the value of the accumulated data size register 18 to a value obtained by adding 4 bytes every assertion. The sequence controller 19 asserts BDU, which is directed to the output data register 12, the block address register 15 and the block size register 16, and at time t36, MADD is set at 1000 (HEX), MDATA is set at 128-bit data [D5, D4, D3, D2], and MDS is set at a signal indicating 16 bytes. At this time, the sequence controller 19 asserts BDWR requesting the memory controller 2 to write data. In addition, the sequence controller 19 issues an address update command for updating by 16 bytes by asserting BAU, to update BA to 1010 (HEX) by adding 16 bytes to address 1000 (HEX) at time t37. In this way, the CPU 1 can sequentially write four 4-byte values into the input data register 11 without setting a new transfer destination address in the initial address register 13, and thereby transfer 16-byte data composed of the four 4-byte values to address 1010 (HEX) in the SDRAM 3.

Figure 4:
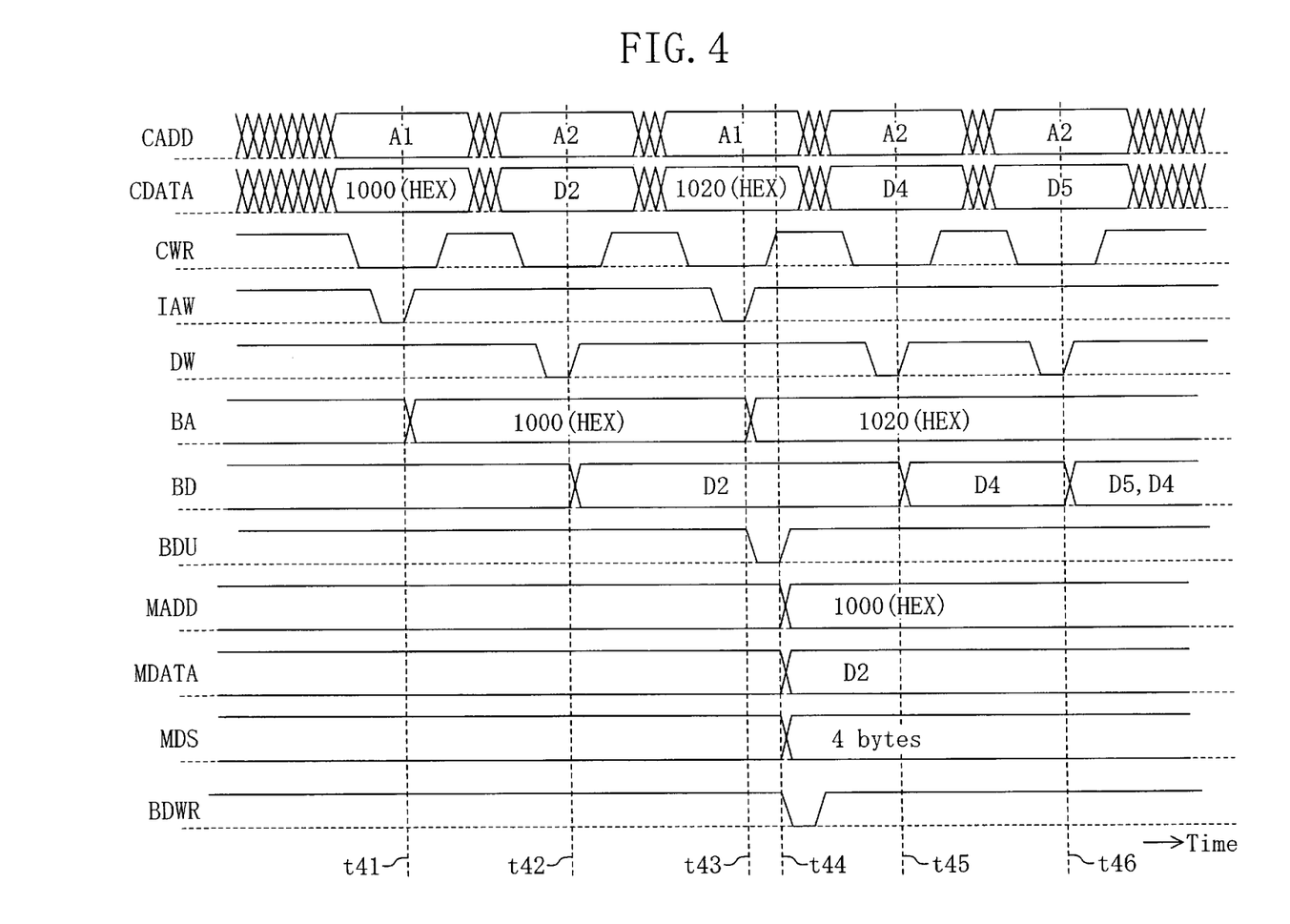
FIG. 4 is a timing chart showing another example of the operation of the data buffer in FIG. 1.

Referring to FIG. 4, another example of the operation of the data buffer 5 will be described. In this case, write into the initial address register 13 occurs when data having a size less than 16 bytes as the block size, such as 4-byte data, is left in the input data register 11. At time t41, 1000 (HEX) is written into the initial address register 13 accessed under address A1. At time t42, data D2 is written into the input data register 11 accessed under address A2. At this point of time, the 4-byte data D2 corresponding to a quarter of 16 bytes as the block size exists as part of the block data headed by address 1000 (HEX). In this state, at time t43, a new block address 1020 (HEX) is written into the initial address register 13. In response to this write into the initial address register 13, the sequence controller 19 asserts BDU at time t43. As a result, at time t44, MADD is set at 1000 (HEX), MDATA is set at D2, and MDS is set at a signal indicating 4 bytes. The sequence controller 19 asserts BDWR, requesting the memory controller 2 to write the data.

Next, referring to FIG. 5, yet another example of operation of the data buffer 5 will be described. In this case, 1008 (HEX), which is not at a 16-byte boundary as the block data size, is set in the initial address register 13. At time t51, 1008 (HEX) is written into the initial address register 13 accessed under address A1. At time t52, data D2 is written into the input data register 11 accessed under address A2. At this time, the sequence controller 19 knows that the value of IADD, that is, 1008 (HEX), is not at a 16-byte boundary. The sequence controller 19 asserts BDU, updates BD to D2, and issues an address update command for updating by 4 bytes by asserting BAU, to update BA to 100C (HEX) by adding 4 bytes to address 1008 (HEX).

At time t53, by the assertion of BDU, MADD is set at 1008 (HEX), MDATA is set at D2, and MDS is set at a signal indicating 4 bytes. At this time, the sequence controller 19 asserts BDWR to request the memory controller 2 to write data. At time t54, data D3 is written into the input data register 11. In response to this, the sequence controller 19 asserts BDU, updates BD to D3, and issues an address update command for updating by 4 bytes by asserting BAU, to update the block address counter 14 to 1010 (HEX) by adding 4 bytes to address 100C (HEX). At time t55, by the assertion of BDU, MADD is set at 100C (HEX), MDATA is set at D3, and MDS is set at a signal indicating 4 bytes. At this time, the sequence controller 19 asserts BDWR to request the memory controller 2 to write data. At subsequent times t56 and t57, also, data is written into the input data register 11. At these times, however, since the value of BA is at a 16-byte boundary, the sequence controller 19 does not assert BDU but permits data D4 and D5 to be accumulated in the input data register 11. Thereafter, once 16-byte block data is prepared, the sequence controller 19 requests the memory controller 2 to write the block data according to the operation described above.

Figure 5:
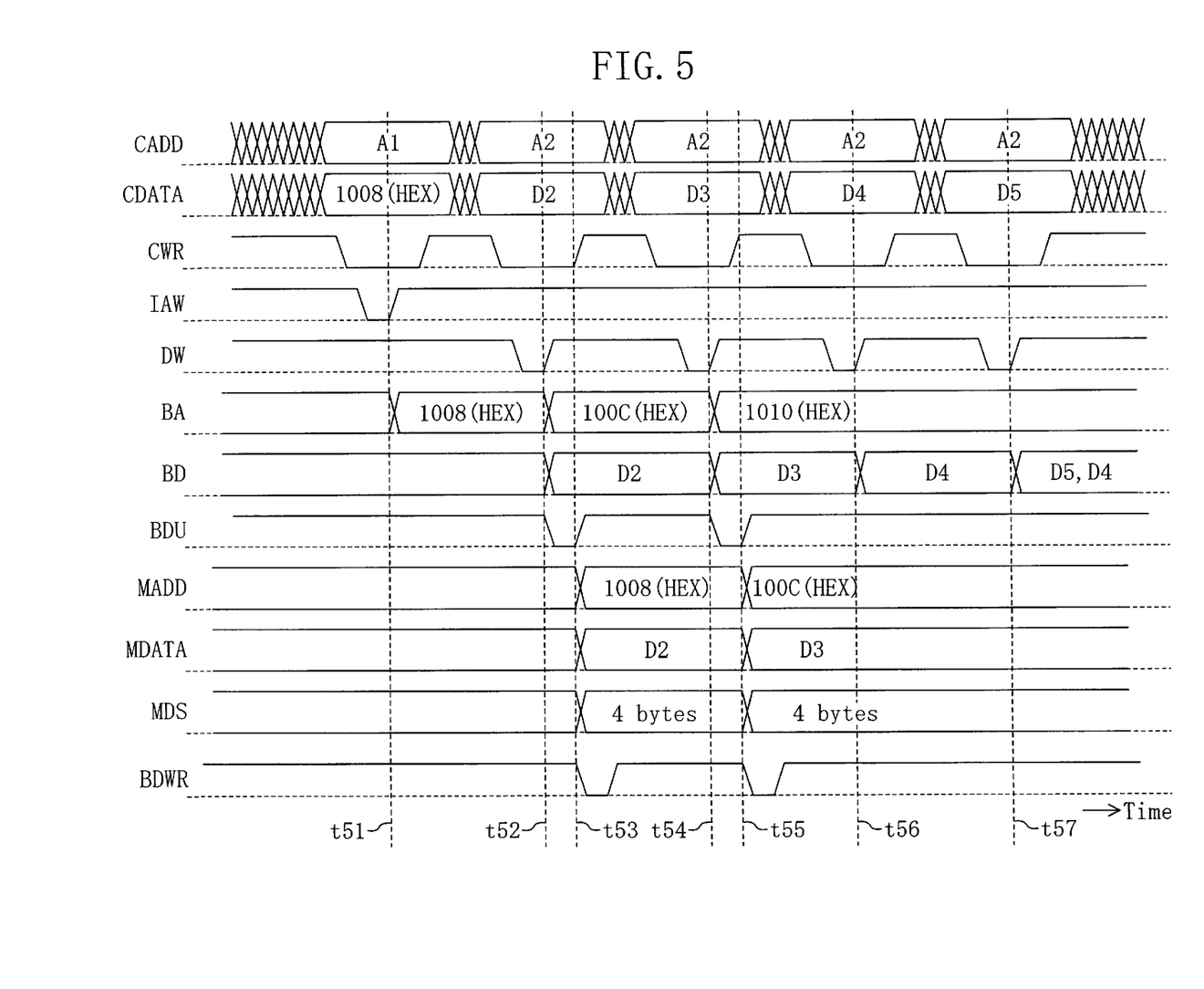
FIG. 5 is a timing chart showing yet another example of the operation of the data buffer in FIG. 1.
Figure 6:
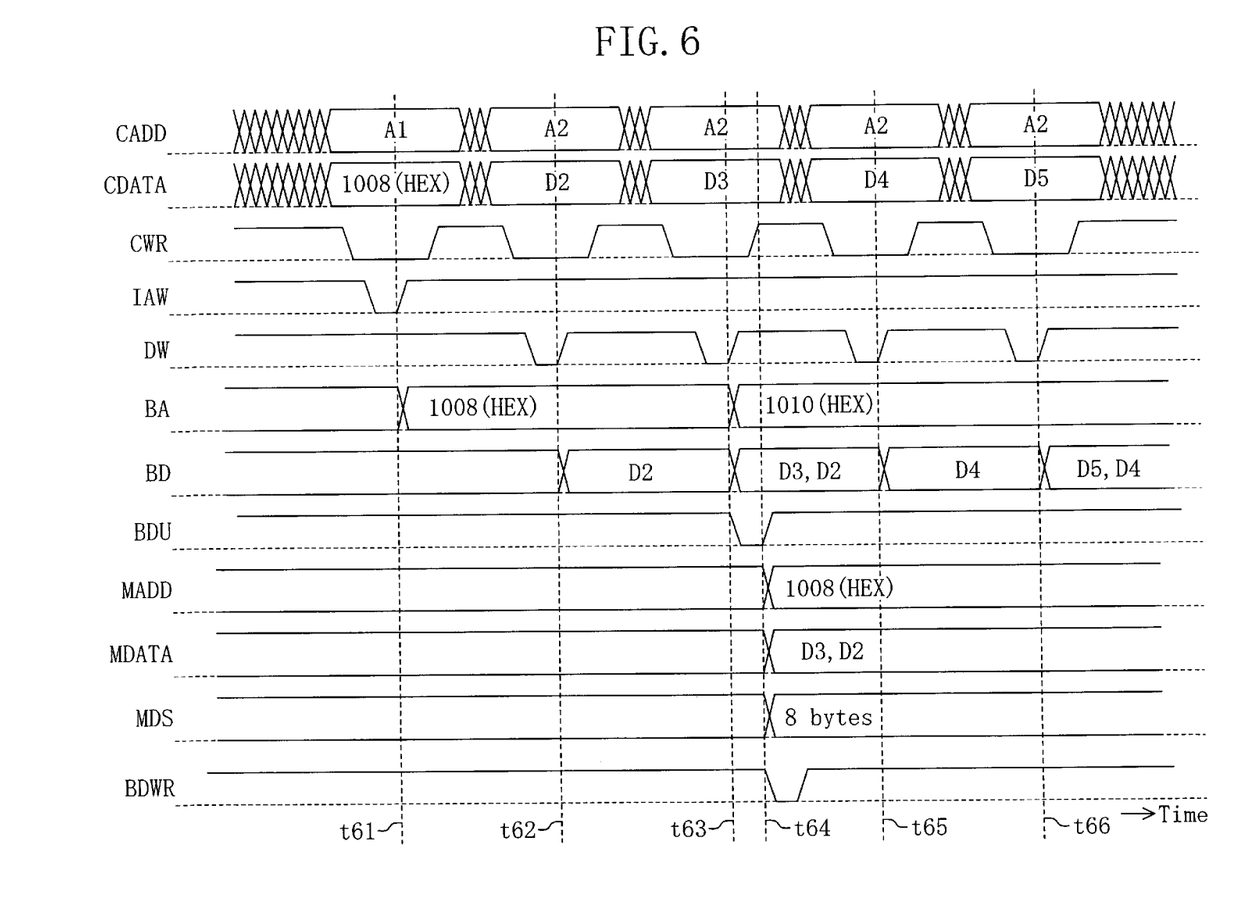
FIG. 6 is a timing chart showing an alteration to that of FIG. 5.

FIG. 6 illustrates an alteration to the timing chart of FIG. 5. In the case shown in FIG. 5, the memory controller 2 permits block transfer in 4-byte units only in addition to the block transfer in 16-byte units. If block transfers in 4-byte units, 8-byte units and 12-byte units are permitted in addition to the block transfer in 16-byte units, the data buffer 5 can be configured to support these transfers. In FIG. 6, as in FIG. 5, assume that 1008 (HEX), which is not at a 16-byte boundary as the block data size, is set in the initial address register 13.

Referring to FIG. 6, at time t61, 1008 (HEX) is written into the initial address register 13 accessed under address A1. At time t62, data D2 is written into the input data register 11 accessed under address A2. BD is then updated to D2. At time t63, data D3 is written into the input data register 11. BD is then updated to D3, D2, and the sequence controller 19 asserts BDU. At time t64, MADD is set at 1008 (HEX), MDATA is set at D3, D2, and MDS is set at a signal indicating 8 bytes. At this time, the sequence controller 19 asserts BDWR to request the memory controller 2 to write data. At subsequent times t65 and t66, also, data is written into the input data register 11. At these times, however, since the value of BA is at a 16-byte boundary, the sequence controller 19 does not assert BDU but permits data D4, D5 to be accumulated in the input data register 11. Thereafter, once 16-byte block data is prepared, the sequence controller 19 requests the memory controller 2 to write the block data according to the operation described above.

Examples of the operation of the data buffer 5 were described with reference to FIGS. 3 to 6. The access to the data buffer 5 by the CPU 1 is not necessarily continuous temporally. For example, an access to the cache memory 4 by the CPU 1 may be inserted between time t31 and time t32 in FIG. 3. The data buffer 5 shown in FIG. 1 can discriminate access requests to itself from those to others at any time by the function of the address decoder 17.

As shown in FIG. 1, when the sequence controller 19 knows from ADS that the input data register 11 already holds data of the maximum size allowed for the input data register 11, the sequence controller 19 generates a data write disable signal (CINH) to disable write of data into the input data register 11 by the CPU 1. This prevents data from being lost.

The output data register 12 may adopt a FIFO structure to enable holding of two or more blocks of block data. With this adoption, the block address register 15 and the block size register 16 may also adopt a FIFO structure. Note that if each of a plurality of process steps executed by the CPU 1 requires a memory resource, the data buffer 5 shown in FIG. 1 may be provided for each of the process steps.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A data buffer for block-unit data transfer, comprising:
   an initial address register for holding a transfer destination address input via a data bus as an initial address;
   an input data register for holding maximum k pieces (k is an integer equal to or more than 2) of M-byte data (M is an integer equal to or more than 1) input via the data bus;
   an address decoder for decoding an address on an address bus so that the transfer destination address on the data bus is written into the initial address register if the address on the address bus is an address designating the initial address register and that the M-byte data on the data bus is written into the input data register if the address on the address bus is an address designating the input data register when a data buffer write signal is provided;
   an accumulated data size register for holding an accumulated data size representing the size of a data block of maximum N bytes (N=kM) accumulated in the input data register;
   an output data register for holding a data block to be transferred;
   a block address register for holding a head address of the data block to be transferred;
   a block size register for holding the block size representing the size of the data block to be transferred;
   a block address counter for setting the initial address transferred from the initial address register as an initial value and holding a block address updated according to the block size; and
   a sequence controller for updating the accumulated data size by M byte(s) every time the M-byte data on the data bus is written into the input data register, setting the block size in the block size register at N bytes if the initial address is an N-byte boundary address (an address divisible by N), waiting until the accumulated data size reaches N bytes, transferring the data block of N bytes accumulated in the input data register to the output data register, transferring the block address held by the block address counter to the block address register, asserting a block data write request signal so that the data block of N bytes held by the output data register is transferred, resetting the accumulated data size at 0, and updating the block address held by the block address counter by N bytes.

2. The data buffer of claim 1, wherein the sequence controller further has a function of continuing processing for transfer of next k pieces of M-byte data using the updated block address without write of a new transfer destination address into the initial address register.

3. The data buffer of claim 1, wherein the sequence controller further has a function of updating the block size in the block size register to the value of the accumulated data size if the accumulated data size is not 0 at the time when the transfer destination address on the data bus is written into the initial address register, transferring the data block accumulated in the input data register to the output data register, transferring the block address held by the block address counter to the block address register, asserting the block data write request signal so that the data block held by the output data register is transferred, and resetting the accumulated data size to 0.

4. The data buffer of claim 1, wherein the sequence controller further has a function of setting the block size in the block size register at M byte(s) if the initial address is not an N-byte boundary address (an address divisible by N), transferring the M-byte data block accumulated in the input data register to the output data register every time the M-byte data on the data bus is written into the input data register, transferring the block address held by the block address counter to the block address register, asserting the block data write request signal so that the M-byte data block held by the output data register is transferred, updating the block address held by the block address counter by M byte(s), resetting the accumulated data size at 0, and then changing the block size in the block size register to N bytes once the block address becomes an N-byte boundary address.

5. The data buffer of claim 1, wherein the sequence controller further has a function of setting the block size in the block size register only after the sum of the block address held by the block address counter and the accumulated data size becomes an N-byte boundary address (an address divisible by N) if the initial address is not an N-byte boundary address, transferring the data block accumulated in the input data register to the output data register, transferring the block address held by the block address counter to the block address register, asserting the block data write request signal so that the data block held by the output data register is transferred, resetting the accumulated data size at 0, and updating the block address held by the block address counter by the value of the accumulated data size.

6. The data buffer of claim 1, wherein the output data register has a capacity large enough to hold a plurality of data blocks simultaneously.

7. The data buffer of claim 1, wherein the sequence controller further has a function of generating a data write disable signal so that write into the input data register is disabled if the accumulated data size indicates the maximum N bytes.

* * * * *